(12) United States Patent
Carlsson et al.

(10) Patent No.: US 12,711,880 B1
(45) Date of Patent: Aug. 18, 2026

(54) MANAGING AUGMENTED-REALITY GRAPHICAL ELEMENTS UNDER THERMAL CONSTRAINTS

(71) Applicant: Distance Technologies Oy, Helsinki (FI)

(72) Inventors: Thomas Carlsson, Vantaa (FI); Harri Kapanen, Espoo (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/346,158

(22) Filed: Sep. 30, 2025

(51) Int. Cl.
*G09G 3/00* (2006.01)
*G06F 3/01* (2006.01)

(52) U.S. Cl.
CPC ............ *G09G 3/001* (2013.01); *G06F 3/013* (2013.01); *G09G 2320/041* (2013.01); *G09G 2320/0626* (2013.01); *G09G 2320/0686* (2013.01); *G09G 2340/0464* (2013.01); *G09G 2354/00* (2013.01); *G09G 2380/10* (2013.01)

(58) Field of Classification Search
CPC ...... B60K 35/23; G02B 27/01; G02B 5/3025; G06F 1/1603; G09F 9/00; G09F 9/302; G09F 9/33; G09G 3/002; G09G 3/32; G09G 2300/026; G09G 2320/041; G09G 2330/026; G09G 2330/045; G09G 2380/10; G09G 3/20; G09G 5/10; G09G 2320/043; G09G 2320/048; G09G 2320/06; G09G 2320/0626
See application file for complete search history.

(56) References Cited

U.S. PATENT DOCUMENTS

2020/0225903 A1* 7/2020 Cohen ...................... G09G 5/12
2026/0057849 A1* 2/2026 Chen .................... B60K 35/215

FOREIGN PATENT DOCUMENTS

EP 4645290 A1 * 11/2025 ........... G06F 1/1603

* cited by examiner

*Primary Examiner* — Nelson M Rosario
(74) *Attorney, Agent, or Firm* — Ziegler IP Law Group, LLC.

(57) ABSTRACT

A system includes a display having a plurality of zones whose luminance is individually controllable, at least one temperature sensor configured to sense at least one of a temperature of the display and a temperature of an ambient environment surrounding the display, and at least one processor. The at least one processor is configured to identify graphical elements to be presented in a sequence of images, determine for each graphical element an importance level and a corresponding set of zones within the display, determine for each zone a minimum luminance level and a maximum luminance level based on at least one graphical element and its importance level, monitor a power usage of the display, and estimate a thermal load based on the power usage and at least one sensed temperature. When the thermal load exceeds a current thermal budget, luminance levels of zones for lowest-importance graphical elements are adjusted.

17 Claims, 8 Drawing Sheets

MANAGING AUGMENTED-REALITY GRAPHICAL ELEMENTS UNDER THERMAL CONSTRAINTS

TECHNICAL FIELD

The present disclosure relates to systems for managing graphical elements presented by displays under thermal constraints. The present disclosure also relates to methods for managing graphical elements presented by displays under thermal constraints.

BACKGROUND

Head-up display (HUD) systems are widely utilised in automotive and augmented reality applications to project graphical information into a user's line of sight while permitting uninterrupted observation of an external environment. In vehicular applications, HUD systems frequently project driving-related information onto a windshield so that a driver can access navigation data, operational parameters, or safety warnings without diverting attention from a roadway. Such systems are developed to improve situational awareness by optically merging synthetic graphical information with scenes external to the vehicle.

In real-world vehicular contexts, HUD systems are constrained by electrical power budgets and thermal management limitations inherent to vehicle architectures. Vehicle manufacturers commonly define strict power budgets for peripheral subsystems in order to preserve electrical efficiency and avoid overburdening a vehicle's distribution network. In certain implementations, any subsystem drawing in excess of roughly 40 watts is characterised as imposing an excessive load, thereby reducing overall driving range and limiting power availability for other functions. By contrast, HUD assemblies intended for high brightness projection may require substantially greater energy, with backlight modules in experimental configurations consuming well above 100 watts when operated at full intensity.

High-power operation further introduces substantial thermal challenges. Heat generated by continuous high brightness not only raises a temperature of the HUD assembly but also amplifies influence of external conditions such as direct sunlight on a dashboard region. Managing such thermal loads requires bulkier cooling structures, additional weight, or active thermal control mechanisms, all of which increase design complexity and cost. These constraints emphasise a difficulty of sustaining reliable HUD performance in compact vehicular environments.

Conventional HUD systems address these power and thermal constraints by employing coarse global optimisation techniques. Such systems typically reduce brightness uniformly across the display or deactivate the HUD altogether when energy availability drops or when thermal thresholds are exceeded. However, these approaches lack fine-grained adjustment capabilities, do not account for the relative importance of individual graphical elements and cannot strategically adapt placement of content within the display. As a result, conventional systems often resort to full shutdown under constrained conditions, limiting access to visual information precisely when operational data remains necessary.

Accordingly, a need exists for HUD systems capable of maintaining visual availability and clarity under dynamic power and thermal constraints, without relying solely on global dimming or system deactivation.

SUMMARY

The present disclosure seeks to provide a system comprising a display having a plurality of zones whose luminance is individually controllable, at least one temperature sensor to sense a temperature of the display or an ambient environment, and at least one processor configured to manage graphical elements based on importance levels, power usage, and thermal load so that a thermal budget is not exceeded. The present disclosure also seeks to provide a method comprising sensing at least one of a display temperature and an ambient temperature, identifying graphical elements, determining importance levels and corresponding zones, monitoring power usage, estimating a thermal load of the display, and adjusting luminance levels of zones corresponding to graphical elements having a lowest importance level until the thermal budget is not exceeded, wherein the display comprises a plurality of zones whose luminance is individually controllable. The aim of the present disclosure is achieved by the system and the method as defined in the appended independent claims to which reference is made. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
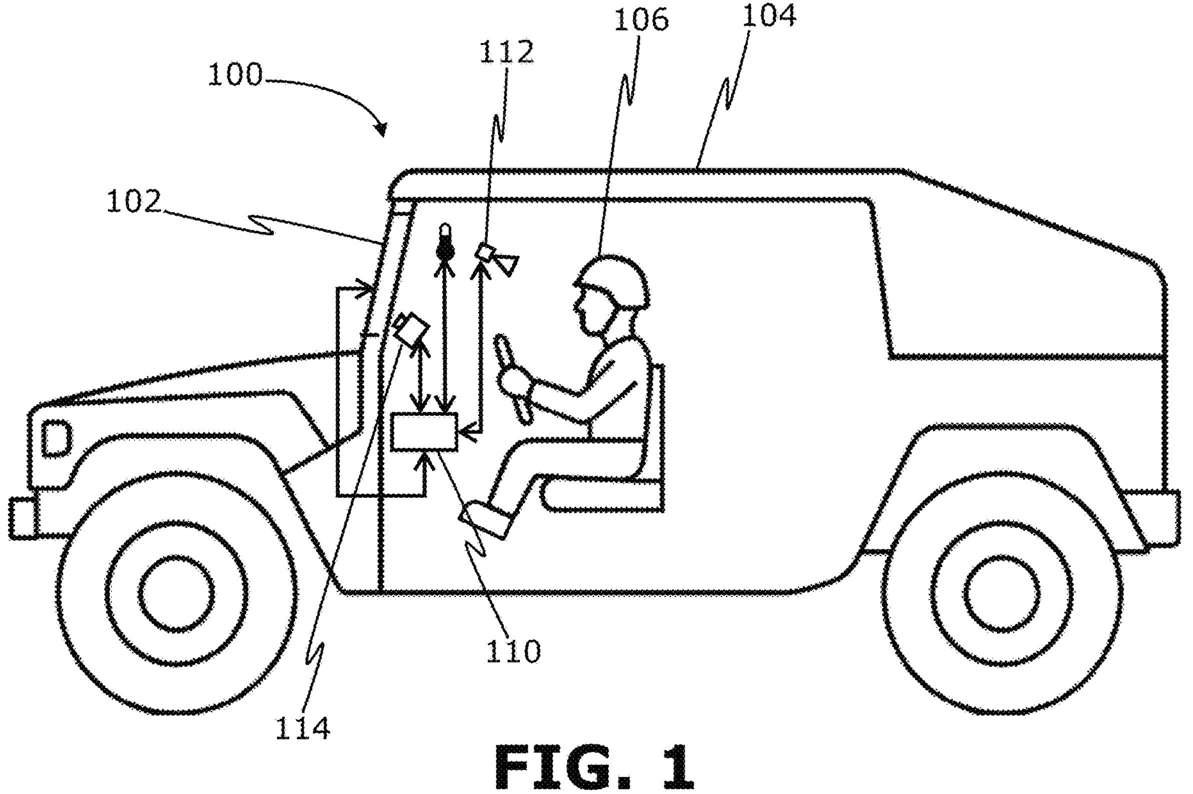
FIG. 1 illustrates an exemplary implementation of a system, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a system comprising:

- a display comprising a plurality of zones whose luminance is individually controllable;
- at least one temperature sensor employed to sense at least one of: a temperature of the display, a temperature of an ambient environment surrounding the display; and
- at least one processor configured to:
  - identify a plurality of graphical elements to be presented in a sequence of images;
  - for each graphical element, determine a corresponding importance level;
  - for each graphical element, determine a corresponding set of zones within the display that are to be used to present said graphical element;
  - for each zone, determine a minimum luminance level and a maximum luminance level, based on at least one graphical element to be presented by said zone, and an importance level of the at least one graphical element;
  - monitor a power usage of the display;
  - estimate a thermal load of the display based on the power usage and the at least one of: the temperature of the display, the temperature of the ambient environment;
  - determine whether the thermal load exceeds a current thermal budget; and
  - when it is determined that the thermal load exceeds the current thermal budget,
    - identify first zones that correspond to at least one graphical element having a lowest importance level; and
    - adjust luminance levels of the first zones to lie between respective minimum luminance levels and respective maximum luminance levels.

In a second aspect, the present disclosure provides a method comprising:

- sensing, using at least one temperature sensor, at least one of: a temperature of a display, a temperature of an ambient environment surrounding the display;
- identifying a plurality of graphical elements to be presented in a sequence of images;
- for each graphical element, determining a corresponding importance level;
- for each graphical element, determining a corresponding set of zones within the display that are to be used to present said graphical element, wherein the display comprises a plurality of zones whose luminance is individually controllable;
- for each zone, determining a minimum luminance level and a maximum luminance level, based on at least one graphical element to be presented by said zone, and an importance level of the at least one graphical element;
- monitoring a power usage of the display;
- estimating a thermal load of the display based on the power usage and the at least one of: the temperature of the display, the temperature of the ambient environment;
- determining whether the thermal load exceeds a current thermal budget; and
- when it is determined that the thermal load exceeds the current thermal budget,
  - identifying first zones that correspond to at least one graphical element having a lowest importance level; and
  - adjusting luminance levels of the first zones to lie between respective minimum luminance levels and respective maximum luminance levels.

The present disclosure provides the system as described herein for managing graphical elements presented by the display under thermal budget-limited conditions. The term “display” as used throughout the present disclosure relates to a device configured to present graphical elements into a gaze direction determined by a tracker while maintaining visibility of a surrounding real-world environment. In one exemplary implementation, the display is implemented as a transparent display integrated into a windshield of a vehicle, where graphical elements are overlaid directly into a driver’s line of sight while maintaining visibility of the surrounding real-world environment. In another exemplary implementation, the display is implemented as a non-transparent display used in combination with an optical combiner integrated into the windshield, where graphical elements generated by the display are reflected toward the driver while allowing transmission of the real-world environment through the optical combiner. A technical benefit provided by both implementations is that graphical elements of importance remain visible within the field of view of the driver without obstructing the real-world environment, while the system regulates luminance across zones to maintain operation within the thermal budget.

The display comprises the plurality of zones whose luminance is individually controllable. The term “zone” as used throughout the present disclosure relates to an individually controllable region within the display. The plurality of zones is arranged in a matrix, wherein each zone is implemented as an M×N array of light-emitting elements. Shapes of the zones are not limited to rectangular structures and extend to zone boundaries defined by the processor or to portions of the image plane shaped by configuration of the display. The zones are driven independently at luminance levels determined by the graphical elements assigned to them. A technical benefit provided by structuring the display into independently controllable zones is that luminance is modulated with fine granularity, thereby reducing zones with luminance above the thermal budget, improving stable operation of the display and sustained operation under the thermal budget.

The system further comprises the temperature sensor, which is employed to sense at least one of the temperature of the display and the temperature of an ambient environment surrounding the display. The temperature sensor is implemented as one or more sensors positioned near or on the display to monitor temperature. The correspondence between the temperature sensor and the plurality of zones is not one-to-one. For example, one temperature sensor provides readings for a plurality of zones, and adjustment between luminance levels by the processor is employed to estimate corresponding temperatures of individual zones. Further, thermal and power variations behave differently. The power variations occur rapidly and are applied at a fine granularity, whereas the thermal variations evolve slowly and integrate an effect of combined luminance drive of active zones. Therefore, monitoring of temperature is implemented with a small number of sensed zones of the display, such as on a surface of the display, on the processor, or at zones corresponding to analysis by a camera. Further, the monitoring of temperature is combined with power usage data for accurate estimation of thermal load.

The processor identifies the plurality of graphical elements to be presented in a sequence of images. The term "sequence of images" as used throughout the present disclosure relates to successive images that together form a continuous visual output of the display. Since the same graphical elements are typically presented across consecutive images, identification of the graphical elements and their related determinations need not be repeated for each image. Moreover, provided that the graphical elements remain fixed in relation to a user's view frustum and the user's eye position is stable, the same determinations are applied across multiple images. A technical benefit provided is that repeated computation is avoided, enabling efficient use of resources in processor-executed implementations.

The processor determines the importance level of each graphical element. The term "importance level" as used throughout the present disclosure relates to a relative priority assigned to a graphical element. The importance level is determined at a given time instant, either as a processor-assigned importance level or as an assigned importance score compared against stored luminance limits. For example, the graphical elements are classified as critical, high, or normal. In this example, a graphical element indicating a critical condition is assigned critical importance, a graphical element presenting operational data is assigned high importance, and a graphical element representing environmental data is assigned normal importance. In another example, the importance level is determined as a dynamically adjusted importance level. In this example, if the importance level is higher than a first stored luminance limit, the graphical element is treated as having critical importance; if the importance level lies between a first and second thresholds, the graphical element is treated as having high importance; and if the importance level lies below the second threshold, the graphical element is treated as having normal importance. The number of levels is not limited to three and can be fewer or greater depending on system configuration. The importance level is also dynamically adjusted according to the real-world environment determined by the camera, for example, by increasing the importance level for an object that the user is actively observing (for example, as determined by determination of gaze direction by the tracker). A technical benefit provided by determination of importance levels is that the system directs available thermal and power resources preferentially toward critical graphical elements while dimming or suppressing lower importance elements, thereby maintaining visibility of critical graphical elements.

The processor determines a set of zones within the display for each graphical element. The determination specifies which regions of the display are employed for presenting a given graphical element. For example, a graphical element presenting operational data occupies a set of peripheral zones of the image plane, whereas a graphical element associated with an object on the predicted path spans a set of central zones. A technical benefit provided by assigning graphical elements to defined sets of zones is that rendering is spatially confined to the required areas, avoiding unnecessary activation of unrelated zones, minimising power requirements, and limiting thermal accumulation.

For each zone, the processor determines the minimum luminance level and the maximum luminance level based on the graphical elements assigned to that zone and the importance level of those graphical elements. The minimum luminance level is the lowest brightness that preserves visibility of a graphical element under current conditions, and the maximum luminance level is the highest brightness allowable under thermal constraints. For graphical elements of critical importance, the minimum luminance level is set at sufficiently high brightness to guarantee legibility. For graphical elements of high or normal importance, the minimum luminance level is set to zero luminance, where zero luminance corresponds to hiding the graphical element. Thus, in certain modes, high importance elements are dimmed significantly or hidden when necessary to maintain overall progressive regulation of the thermal budget. Inactive zones that are not assigned any graphical element are configured with equal values for minimum and maximum luminance, resulting in effective deactivation. A technical benefit provided by assigning minimum and maximum luminance levels of each zone is that contrast is controlled according to significance of displayed graphical elements, visual load on the user is reduced, unnecessary brightness is avoided, and thermal loads are moderated.

The processor monitors a power usage of the display and estimates a thermal load. The power usage represents instantaneous energy drawn by the display, while thermal load accumulates progressively over time. Estimation of the thermal load combines power usage data with temperature readings from the temperature sensor. Since each individual zone is not provided its own temperature sensor, the estimation is performed using values of the zones determined from the temperature sensor at a limited number of measurement locations on the display and ambient environment, together with integration of power usage values determined by the processor. A technical benefit provided is that fast-changing power variations and slower thermal effects are accurately captured without excessive processing requirement of the tracker or the camera.

The processor determines whether the thermal load exceeds the current thermal budget. When the thermal budget is exceeded, the system reduces luminance beginning with zones assigned to graphical elements of lowest importance. The zones containing only lower importance elements are driven at reduced brightness, thereby lowering thermal output. Adjustments are applied within the previously determined minimum and maximum luminance ranges, where the ranges are set according to the importance level of the graphical elements. A technical benefit provided is that critical graphical elements remain visible while less important elements are selectively dimmed or hidden, enabling sustained operation of the display without loss of graphical presentation.

In one exemplary implementation, the system is applied in displays integrated into vehicle windshields, where zone-wise luminance control maintains visibility of graphical elements indicating critical conditions and graphical elements presenting operational data under thermal budget-limited conditions. In another exemplary implementation, the system is applied in displays mounted on helmets or visors in aircraft and armoured vehicles, where graphical elements of mission relevance are preserved at sufficient brightness while non-essential elements are reduced in luminance when thermal budgets are exceeded. In yet another exemplary implementation, the system is integrated into displays mounted on the head, where strict energy and thermal constraints require selective allocation of luminance to important graphical elements while lower-importance elements are dimmed or suppressed. A technical benefit provided across these exemplary implementations is that graphical elements of critical importance remain continuously available under varying thermal budgets, while less significant graphical elements are progressively reduced in luminance to conserve resources.

The present disclosure also provides the method for managing graphical elements presented by the display under thermal budget-limited operating conditions. During the method, the thermal load is estimated based on instantaneous power usage data and values of the zones determined from the temperature sensor of the display and its environment. The estimated thermal load is compared to the thermal budget defined by operational constraints of the display. When the thermal budget is not exceeded, all graphical elements are presented at luminance levels within assigned ranges. When the thermal budget is exceeded, zones associated with graphical elements of lower importance are progressively dimmed or deactivated while luminance of critical elements is preserved. A technical benefit provided by the method is that luminance allocation is dynamically matched to both instantaneous power usage and accumulated thermal load, enabling sustained operation of the display without loss of graphical presentation. A further technical benefit is that the method preserves high visibility of graphical elements of critical importance under thermal budget-limited conditions, while reducing unnecessary thermal output from lower-importance elements, thereby supporting sustained operation of the display and maintaining visibility of critical graphical elements.

Optionally, the at least one processor is configured to:

when it is determined that the thermal load exceeds the current thermal budget, determine whether a subsequent thermal load of the display still exceeds the current thermal budget, after adjusting the luminance levels of the first zones; and when it is determined that the subsequent thermal load still exceeds the current thermal budget, identify second zones that correspond to at least one graphical element whose importance level is higher than the lowest importance level and lower than a highest importance level; and adjust luminance levels of the second zones to lie between respective minimum luminance levels and respective maximum luminance levels, until a further subsequent thermal load of the display does not exceed the current thermal budget.

When adjustment of luminance levels in the zones corresponding to graphical elements of the lowest importance level does not sufficiently reduce the thermal load, the processor continues the regulation process by progressively involving zones associated with graphical elements of intermediate importance. The processor evaluates whether the thermal load remains above the thermal budget after the first adjustment. If the thermal load is above the thermal budget, the processor identifies the zones that correspond to graphical elements ranked between the lowest and the highest importance levels. The luminance levels of these zones are then adjusted within the boundaries defined by their respective minimum and maximum luminance levels so that brightness is moderated without full suppression of the graphical elements. A technical benefit of this adjustment process is that thermal balance is restored in a manner where the graphical elements of critical importance remain fully visible while graphical elements of intermediate importance are adaptively dimmed, thereby avoiding abrupt transitions and preserving a consistent visual hierarchy under sustained thermal stress.

Optionally, a size of a single zone is larger than a size of a single pixel of the display, wherein the at least one processor is configured to:

when it is determined that the thermal load exceeds the current thermal budget, identify at least one graphical element from among the plurality of graphical elements that is not constrained to a fixed position in the sequence of images; and relocate the at least one graphical element to a position proximate to at least one other graphical element from among the plurality of graphical elements, wherein at least one other zone is used to present both the at least one graphical element and the at least one other graphical element.

When the thermal load continues to exceed the thermal budget despite initial adjustments, the processor applies a further reduction technique that leverages the relative sizing of the zones and the light-emitting elements of the display. The zones are larger than the individual light-emitting elements of the display. Therefore, multiple graphical elements can be accommodated within a single zone. The processor identifies at least one graphical element that is not constrained to a fixed position in the sequence of images. Said relocation can be performed when the graphical element is not constrained to a fixed position in the sequence of images. The processor places the graphical element proximate to another graphical element that may or may not be constrained to a fixed location. As a result, a single zone is used to present both graphical elements. A technical benefit of this arrangement is that fewer zones are activated, thereby reducing power consumption. Notably, reduced power consumption also lowers the thermal load, which supports thermal stability while maintaining visibility of relevant graphical elements.

Optionally, when relocating, the at least one processor is configured to relocate a plurality of graphical elements to be presented within a predefined portion of a view frustum of the display.

When relocation of graphical elements is initiated under sustained thermal load, the processor applies an additional consolidation technique within the view frustum of the display. A plurality of graphical elements is relocated into a predefined portion of the view frustum. The relocation confines presentation to a smaller region rather than being distributed across the entire view frustum. The consolidation produces a simplified arrangement in which only graphical elements of highest importance are retained in the reduced area. A technical benefit of this approach is that fewer zones are required to maintain visibility of graphical elements of highest importance, thereby reducing power usage and thermal output. The narrowing of the view frustum lowers the thermal load of the display while sustaining presentation of graphical elements of highest importance for situational awareness.

Optionally, the system further comprising a tracker and at least one real-world-facing camera, wherein the display is a heads-up display, and wherein the at least one processor is configured to:

when it is determined that the thermal load exceeds the current thermal budget, determine relative positions of eyes of at least one user with respect to an image plane of the display, using the tracker;

capture, using the at least one real-world-facing camera, at least one real-world image of a real-world environment whose real-world light field is being augmented by the display;

identify at least one portion of the image plane for which a luminance level of a corresponding portion of the real-world light field as projected toward a given eye is lower than a predefined threshold luminance level, based on the at least one real-world image and a relative position of the given eye with respect to the image plane; and relocate at least one graphical element to be presented via at least one other zone that corresponds to the at least one identified portion of the image plane.

When the thermal load remains above the thermal threshold, the processor employs the tracker for determining gaze directions of the eyes and performs analysis by the real-world-facing camera to optimise relocation of graphical elements. The tracker determines relative positions of the eyes with respect to the image plane of the display. The term "image plane" as used throughout the present disclosure refers to an intended location in space where a graphical element is perceived, and does not require the display area or other optical elements on the optical path to be physically planar. The image plane can correspond to a light-emitting surface of the display in a case where the display is directly viewed. Alternatively, the image plane can correspond to an imaginary plane in another case where an optical combiner is employed to facilitate a reflected view. The image plane remains applicable across different optical configurations, whether a distorted image is generated on a curved or non-curved display and reflected through a curved optical combiner, whether an undistorted image is generated on a non-curved display and reflected through a non-curved optical combiner, or whether an image is generated on the display and viewed directly without any optical combiner. Based on the determined eye positions, the real-world-facing camera captures images of the real-world environment. The processor identifies portions of the image plane for which luminance of the corresponding real-world light field projected toward the eyes is below a threshold. The graphical elements are then relocated into zones that correspond to those identified low-luminance portions. A technical benefit is that graphical elements are preferentially presented against backgrounds that are visually darker, thereby maximising contrast for the user while minimising the number of zones required. Notably, reduced power consumption also lowers the thermal load, reinforcing thermal stability during prolonged operation of the display.

Optionally, the display is a heads-up display comprising an active optical device arranged on an optical path of a real-world light field of a real-world environment, wherein the at least one processor is configured to:

when it is determined that the thermal load exceeds the current thermal budget, activate at least one portion of the active optical device to decrease a transmission of a part of the real-world light field passing therethrough toward a given eye of at least one user; and relocate at least one graphical element to be presented via at least one other zone that corresponds to the at least one portion of the active optical device.

When the thermal load continues to exceed the thermal threshold, selective dimming of real-world light entering the viewing channel is employed to reduce visual demand on the display. The active optical device is positioned on the optical path of the real-world light field. The active optical device can be arranged on an optical combiner or on a transparent display so that the perceived image is formed by a combination of the real-world light and the superimposed graphical elements. The processor activates portions of the active optical device to attenuate transmission of the real-world light in selected regions. By decreasing the intensity of the background light projected toward the eyes, the relative visibility of overlaid graphical elements is improved without requiring those elements to be driven at higher luminance. The graphical elements can also be relocated to zones that correspond with the attenuated portions of the active optical device. A technical benefit of this local dimming process is that contrast between the graphical elements and the background is maintained while reducing the need for excessive display power. Notably, reduced power consumption also lowers the thermal load, further contributing to stable operation of the display under extended thermal stress.

Optionally, the at least one processor is configured to:

when it is determined that the thermal load exceeds the current thermal budget, perform at least one of:

reducing a size of at least one graphical element;

modifying at least one appearance parameter of at least one graphical element.

When the thermal load remains above the thermal threshold, graphical regulation extends beyond luminance control to changes in the graphical elements themselves. The processor reduces the spatial extent of a graphical element so that the graphical element can be placed into zones already in use. The reduced graphical element can be positioned into the zone that is used to present both the graphical element and another graphical element as described for earlier relocation. The reduced graphical element can also be positioned into the zone that corresponds to the identified portion of the image plane or into the zone that corresponds to the portion of the active optical device. In some implementations, the active optical device covers only part of the image plane, and reduction in the spatial extent of the graphical element enables efficient use of the attenuated region. Alternatively, the processor modifies presentation parameters of graphical elements such as stroke thickness, character weight, line style, or chromatic intensity.

This modification results in reduced display drive power, which in turn regulates the thermal load. A technical benefit of these adjustments is that graphical information is preserved in a form recognisable to the user, while visual density and display drive energy are reduced, thereby controlling thermal rise under constrained operating conditions.

Optionally, the at least one processor is configured to:

when it is determined that the thermal load exceeds the current thermal budget, determine when at least one first zone corresponds to both a first graphical element having a first importance level and a first portion of a second graphical element having a second importance level that is lower than the first importance level, and when the at least one second zone corresponds to a second portion of the second graphical element only;

when it is determined that the at least one first zone corresponds to both the first graphical element and the first portion of the second graphical element, and the at least one second zone corresponds to the second portion of the second graphical element only, drive the at least one first zone at a first luminance level corresponding to the first importance level and the at least one second zone at a second luminance level corresponding to the second importance level; and adjust a rendered intensity of the first portion of the second graphical element in the sequence of images, to match an estimated perceived luminance of the first portion of the second graphical element with an estimated perceived luminance of the second portion of the second graphical element.

When the thermal load remains above the thermal threshold, a condition arises where zones overlap between graphical elements of different importance levels. The processor determines when a first zone corresponds to both a graphical element of higher importance level and a portion of a graphical element of lower importance level, while a second zone corresponds only to the remaining portion of the graphical element of lower importance level. The processor maintains the first zone at a brightness level corresponding to the higher importance level so that critical information remains fully visible. The second zone is driven at a brightness level corresponding to the lower importance level. To maintain perceptual uniformity, the processor adjusts importance level rendered intensity of the portion of the graphical element of lower importance level located in the first zone so that its perceived brightness matches the perceived brightness of the portion located in the second zone. The maintaining of perceptual uniformity compensates for a difference in the first brightness level and the second brightness level. A technical benefit of this process is that graphical elements of lower importance level appear uniformly dimmed across their spatial extent, avoiding a patchy appearance, while graphical elements of higher importance level remain presented at higher brightness for clear visibility.

Optionally, the system further comprising a tracker, wherein the at least one processor is configured to:

- determine gaze directions of eyes of at least one user, using the tracker;
- identify a graphical element at which the at least one user is looking, based on the gaze directions; and
- at least temporarily increase an importance level of the identified graphical element.

The tracker determines gaze directions of eyes of the user, and the processor identifies the graphical element that lies along the determined gaze direction. When the gaze is detected, the processor at least temporarily increases an importance level of the identified graphical element. A technical benefit of this adjustment is that a graphical element being looked at by the user is presented with increased clarity at the moment of observation. Another technical benefit is that graphical elements not being looked at are maintained at lower luminance levels, which reduces drive energy and helps stabilise thermal load of the display.

Optionally, the system further comprising at least one real-world-facing camera, wherein the display is a heads-up display, and wherein the at least one processor is configured to:

- capture, using the at least one real-world-facing camera, at least one real-world image of a real-world environment whose real-world light field is being augmented by the display;
- identify a real-world object that lies on a predicted path of a vehicle in which the system is implemented; and
- at least temporarily increase an importance level of a graphical element that corresponds to the identified real-world object.

The real-world-facing camera of the system captures at least one real-world image of the real-world environment whose real-world light field is augmented by the heads-up display. The processor analyses the captured real-world image to predict the path of the vehicle. When a real-world object is identified as lying on the predicted path, the processor at least temporarily increases an importance level of a graphical element corresponding to the identified real-world object in the heads-up display. A technical benefit of this arrangement is that graphical elements corresponding to real-world objects lying on the predicted path of the vehicle are presented with higher importance level, thereby supporting timely recognition by the user. Another technical benefit is that graphical elements not lying on the predicted path remain regulated at lower luminance, which conserves display drive energy and stabilises the thermal load.

Optionally, the at least one processor is configured to:

- determine, for each graphical element, a corresponding bounding box within the display that is to be employed to present said graphical element; and
- generate a mapping between each graphical element and a corresponding set of zones within the display that overlap with its corresponding bounding box.

The processor determines, for each graphical element, the corresponding bounding box in display coordinates within the display that is to be employed to present the graphical element. The corresponding bounding box can be calculated by the processor based on a size of the graphical element, or retrieved from a data repository when pre-stored for a graphical element that is presented via a fixed portion of the display. The processor then generates a mapping between each graphical element and a corresponding set of zones within the display that overlap with the corresponding bounding box. The set of zones has members of the same size, and the zones are typically smaller in size than the corresponding bounding box. A size of the corresponding bounding box depends on a size of the graphical element that is to be presented within the bounding box, such that multiple zones may overlap with a single bounding box. A technical benefit of this arrangement is that the driving of zones can be regulated at a fine granularity while preserving the bounding box of the graphical element, thereby reducing a thermal load of the display. Another technical benefit is that retrieval of bounding boxes for fixed graphical elements reduces the processing load of the processor, while calculation of bounding boxes enables adaptation to movable or resizable graphical elements.

The present disclosure further relates to the method as described above. Various embodiments and variants disclosed above with respect to the system described in the first aspect, apply mutatis mutandis to the method in the second aspect.

Optionally, the method further comprising:

- when it is determined that the thermal load exceeds the current thermal budget,
  - determining whether a subsequent thermal load of the display still exceeds the current thermal budget, after adjusting the luminance levels of the first zones; and
  - when it is determined that the subsequent thermal load still exceeds the current thermal budget,
    - identifying second zones that correspond to at least one graphical element whose importance level is higher than the lowest importance level and lower than a highest importance level; and
    - adjusting luminance levels of the second zones to lie between respective minimum luminance levels and respective maximum luminance levels, until a further subsequent thermal load of the display does not exceed the current thermal budget.

When it is determined that the thermal load exceeds the current thermal budget, regulation continues by evaluating whether the thermal load remains above the thermal budget after adjustment of luminance levels of the first zones. If the thermal load still exceeds the thermal budget, second zones that correspond to graphical elements whose importance level lies above the lowest importance level and below the highest importance level are identified. The luminance levels of the second zones are adjusted within boundaries defined by the respective minimum luminance levels and maximum luminance levels, so that moderation of luminance occurs without full suppression of the graphical elements. A technical benefit of this regulation is that balance of the thermal load is progressively restored, while graphical elements of intermediate importance level remain presented in a recognisable form. This preserves the relative importance level across graphical elements and avoids abrupt transitions in presentation during continued control of the thermal load. Optionally, a size of a single zone is larger than a size of a single pixel of the display, the method further comprising:

when it is determined that the thermal load exceeds the current thermal budget, identifying at least one graphical element from among the plurality of graphical elements that is not constrained to a fixed position in the sequence of images; and relocating the at least one graphical element to a position proximate to at least one other graphical element from among the plurality of graphical elements, wherein at least one other zone is used to present both the at least one graphical element and the at least one other graphical element.

When the thermal load exceeds the thermal budget, a difference in scale between a zone and an individual pixel of the display is used. At least one graphical element that is not fixed to a specific location in the successive images forming the visual output is identified. The graphical element is relocated into proximity with another graphical element so that both graphical elements are presented through a common zone. A technical benefit of this arrangement is that fewer zones are required to sustain visibility of the graphical elements, thereby reducing power usage and lowering the thermal load during continued operation.

Optionally, in the method, the step of relocating comprises relocating a plurality of graphical elements to be presented within a predefined portion of a view frustum of the display.

When the thermal load exceeds the thermal budget, the plurality of graphical elements is relocated into the predefined portion of the view frustum of the display. The relocation is confined to the predefined portion rather than being distributed across the full extent of the view frustum. A technical benefit is that fewer zones are required to display the graphical elements, thereby reducing power usage and moderating the thermal load while maintaining visibility of important information.

Optionally, the method further comprising:

when it is determined that the thermal load exceeds the current thermal budget, determining relative positions of eyes of at least one user with respect to an image plane of the display, using a tracker, wherein the display is a heads-up display;

capturing, using at least one real-world-facing camera, at least one real-world image of a real-world environment whose real-world light field is being augmented by the display;

identifying at least one portion of the image plane for which a luminance level of a corresponding portion of the real-world light field as projected toward a given eye is lower than a predefined threshold luminance level, based on the at least one real-world image and a relative position of the given eye with respect to the image plane; and relocating at least one graphical element to be presented via at least one other zone that corresponds to the at least one identified portion of the image plane.

When the thermal load exceeds the thermal budget, relative positions of the eyes of the user with respect to the image plane of the heads-up display are determined using the tracker. At least one real-world image of the real-world environment, in which the real-world light field is augmented by the display, is captured using the real-world-facing camera. Based on the captured image and the determined eye position relative to the image plane, at least one portion of the image plane is identified for which the luminance level of the corresponding portion of the real-world light field projected toward the given eye is lower than the threshold luminance level. At least one graphical element is then relocated to be presented in the zone that corresponds to the identified portion of the image plane. A technical benefit of this arrangement is that graphical elements are preferentially positioned against visually darker regions of the background, thereby improving perceptual contrast without requiring higher luminance drive. Another technical benefit is that relocation into such zones reduces the number of active zones needed for visibility, conserving display power and lowering thermal load while sustaining clear presentation of critical graphical information.

Optionally, in the method, the display is a heads-up display comprising an active optical device arranged on an optical path of a real-world light field of a real-world environment, the method further comprising:

when it is determined that the thermal load exceeds the current thermal budget, activating at least one portion of an active optical device to decrease a transmission of a part of a real-world light field passing therethrough toward a given eye of at least one user; and relocating at least one graphical element to be presented via at least one other zone that corresponds to the at least one portion of an active optical device.

When the thermal load exceeds the thermal budget, at least one portion of the active optical device arranged on the optical path of the real-world light field of the real-world environment is activated to attenuate transmission of the portion of the real-world light field passing toward the eye of the user. At least one graphical element is then relocated to be presented in the zone that corresponds to the activated portion of the active optical device. A technical benefit of this process is that contrast between the graphical element and the real-world background is improved without requiring higher luminance levels for the graphical element. Another technical benefit is that reduced luminance demand of the display lowers power consumption, which in turn reduces temperature rise and contributes to thermal stability while maintaining visibility of graphical information.

Optionally, the method further comprising:

when it is determined that the thermal load exceeds the current thermal budget, performing at least one of:

reducing a size of at least one graphical element;

modifying at least one appearance parameter of at least one graphical element.

When the thermal load exceeds the thermal budget, presentation of graphical elements is regulated by either reducing the size of the graphical element or modifying the at least one appearance parameter of the graphical element. Such modification can involve adjusting thickness, font weight, line style, or chromatic intensity. A technical benefit of reducing size or modifying appearance parameters is that visibility of graphical elements is maintained in a recognisable form while reducing display drive energy. Another technical benefit is that reduced drive energy lowers the thermal load, thereby stabilising operation of the display under constrained conditions. Optionally, the method further comprising:

when it is determined that the thermal load exceeds the current thermal budget, determining when at least one first zone corresponds to both a first graphical element having a first importance level and a first portion of a second graphical element having a second importance level that is lower than the first importance level, and when the at least one second zone corresponds to a second portion of the second graphical element only;

when it is determined that the at least one first zone corresponds to both the first graphical element and the first portion of the second graphical element, and the at least one second zone corresponds to the second portion of the second graphical element only, driving the at least one first zone at a first luminance level corresponding to the first importance level and the at least one second zone at a second luminance level corresponding to the second importance level; and adjusting a rendered intensity of the first portion of the second graphical element in the sequence of images, to match an estimated perceived luminance of the first portion of the second graphical element with an estimated perceived luminance of the second portion of the second graphical element.

When the thermal load exceeds the thermal budget, at least one first zone corresponds to both the first graphical element having the first importance level and the first portion of the second graphical element having the second importance level that is lower than the first importance level, while at least one second zone corresponds to the second portion of only the second graphical element. The first zone is driven at the luminance level corresponding to the first importance level, and the second zone is driven at the luminance level corresponding to the second importance level. An intensity of the first portion of the second graphical element is then adjusted so that its perceived luminance matches the perceived luminance of the second portion of the second graphical element. A technical benefit of this adjustment is that graphical elements having the second importance level are perceived with uniform luminance across their extent, while graphical elements having the first importance level remain visible at higher brightness to maintain clarity.

Optionally, the method further comprising:

determining gaze directions of eyes of at least one user, using a tracker;

identifying a graphical element at which the at least one user is looking, based on the gaze directions; and at least temporarily increasing an importance level of the identified graphical element.

The gaze directions of eyes of at least one user are determined using the tracker. Based on the determined gaze directions, the graphical element at which the user is looking is identified. An importance level of the identified graphical element is then at least temporarily increased. A technical benefit of this adjustment is that the graphical element being observed by the user is presented with higher clarity at the moment of observation. Another technical benefit is that graphical elements not under direct observation remain presented at lower luminance, which conserves energy and moderates thermal load of the display.

Optionally, the method further comprising:

capturing, using at least one real-world-facing camera, at least one real-world image of a real-world environment whose real-world light field is being augmented by the display, wherein the display is a heads-up display;

identifying a real-world object that lies on a predicted path of a vehicle in which the heads-up display is implemented; and at least temporarily increasing an importance level of a graphical element that corresponds to the identified real-world object.

The at least one real-world-facing camera captures images of the real-world environment that is augmented by the heads-up display. The captured real-world images are analysed to determine the path of the vehicle and to predict which portions of the real-world environment lie along that path. Further, when the real-world object is identified within the captured images as lying on the predicted path, the importance level of the graphical element associated with that real-world object is at least temporarily increased while the object remains on the predicted path. A technical benefit of this arrangement is that graphical elements corresponding to real-world objects directly encountered by the vehicle are presented with higher clarity, supporting timely recognition and safer interaction. Another technical benefit is that emphasis is selectively applied to objects relevant to vehicle trajectory while other graphical elements remain regulated, thereby conserving resources and moderating thermal load.

DETAILED DESCRIPTION OF THE DRAWINGS

FIG. 1 illustrates an exemplary implementation of a system 100, in accordance with an embodiment of the present disclosure. The system 100 comprises a heads-up display 102 that is shown integrated into a windshield of a vehicle 104. The heads-up display 102 overlays graphical elements onto a view of a real-world environment to provide information to a user 106 without obstructing visibility of the real-world environment. The heads-up display 102 includes a display comprising a plurality of zones whose luminance is individually controllable. The plurality of zones is arranged within the display of the heads-up display 102 to enable presentation of graphical elements with different luminance levels in different portions of the display.

The system 100 further comprises at least one temperature sensor 108 employed to sense at least one of a temperature of the display and a temperature of an ambient environment surrounding the display. Moreover, the system 100 comprises at least one processor 110 connected to the heads-up display 102 and the at least temperature sensor 108. The at least one processor 110 is configured to identify a plurality of graphical elements to be presented in a sequence of images, determine an importance level for each graphical element, determine a corresponding set of zones within the display that are to be used to present each graphical element, and determine a minimum luminance level and a maximum luminance level for each zone based on the graphical elements assigned to the zone and the respective importance levels. The at least one processor 110 is further configured to monitor a power usage of the display, estimate a thermal load of the display based on the power usage and at least one of a temperature of the display and a temperature of an ambient environment, and determine whether the thermal load exceeds a current thermal budget. When it is determined that the thermal load exceeds the current thermal budget, the at least one processor 110 identifies first zones that correspond to graphical elements having a lowest importance level and adjusts luminance levels of the first zones within respective minimum luminance levels and maximum luminance levels.

The system 100 further comprises a tracker 112 connected to the at least one processor 110. The tracker 112 determines relative positions of eyes of the user 106 with respect to an image plane of the display and further determines gaze directions of the eyes, enabling the system to increase an importance level of graphical elements that are looked at by the user 106. A real-world-facing camera 114 is also shown connected to the at least one processor 110. The real-world-facing camera 114 captures images of the real-world environment that is being augmented by graphical elements presented on the heads-up display 102. The captured images are usable by the at least one processor 110 to identify portions of the image plane for which luminance of a corresponding portion of the real-world light field is below a threshold luminance level and to relocate graphical elements to zones corresponding to such identified portions.

It will be understood that FIG. 1 provides a schematic illustration of the system 100 to support explanation of operation of the system 100 in accordance with the claims. Additional components, such as optical arrangements, transparent support structures, or further processing circuitry, may also be part of the system 100 depending on implementation. The heads-up display 102, the at least one processor 110, the tracker 112, and the real-world-facing camera 114 are shown schematically for clarity, and their arrangement may differ in other implementations.

Figure 2A:
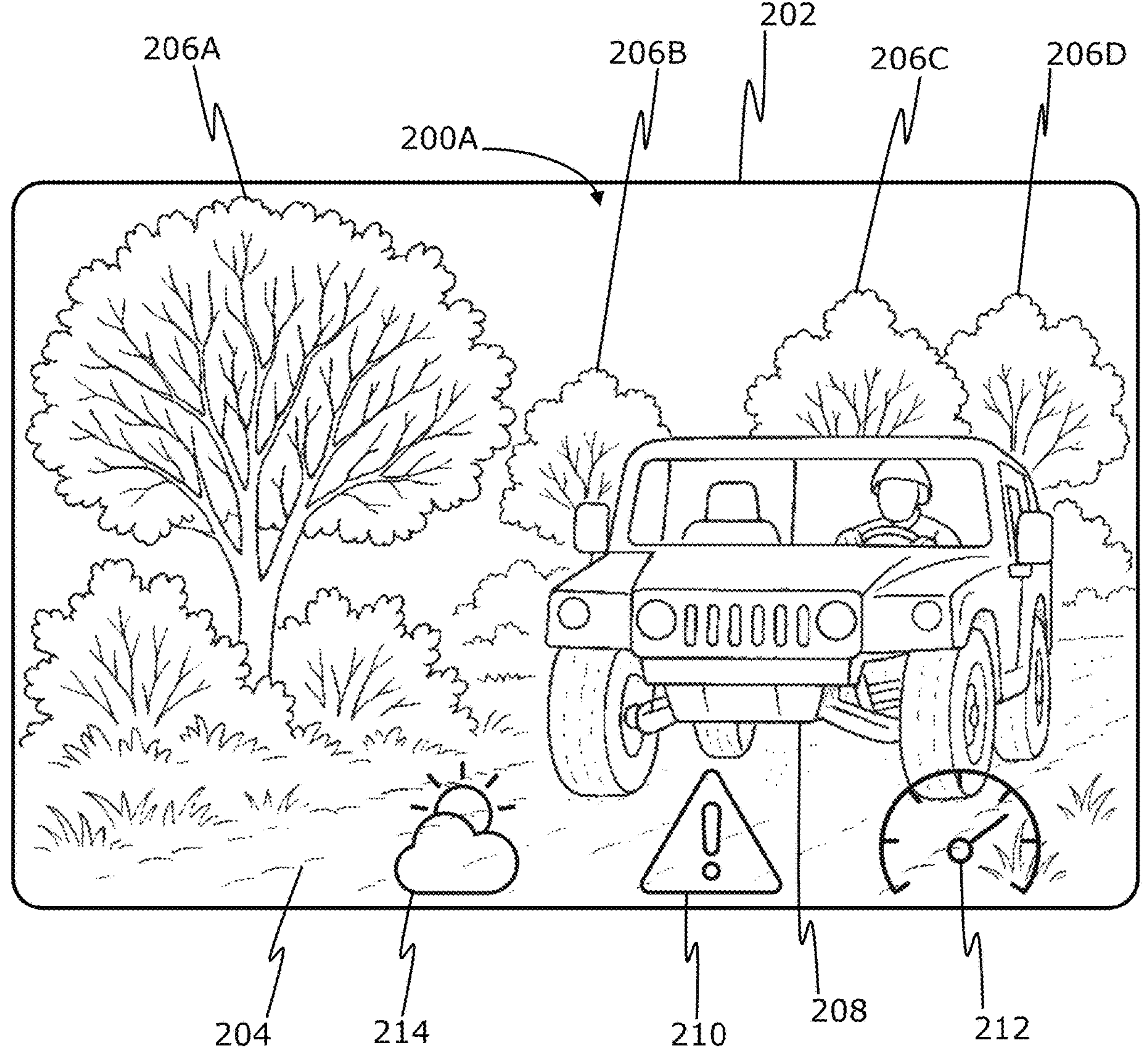
FIG. 2A illustrates an exemplary viewing scenario as seen from a heads-up display of a present vehicle (such as the heads-up display of the vehicle shown in FIG. 1), in accordance with an embodiment of the present disclosure.

FIG. 2A illustrates an exemplary viewing scenario 200A as seen from a heads-up display 202 of a present vehicle (such as the heads-up display 102 of the vehicle 104 shown in FIG. 1), in accordance with an embodiment of the present disclosure. A vehicle within which the heads-up display 202 is implemented is referred to as the present vehicle throughout the remainder of the present disclosure. The viewing scenario 200A depicts presentation of graphical elements under a condition in which a thermal load associated with operation of the heads-up display 202 does not exceed a current thermal budget. The viewing scenario 200A shows a predicted path 204 of a road along which the present vehicle is travelling within a real-world environment comprising trees 206A, 206B, 206C and 206D positioned alongside the road.

On the predicted path 204, another vehicle 208 is shown being driven ahead of the present vehicle in a manner such that a potential collision could occur if the relative speeds and positions remain unchanged. A graphical element representing a collision warning indicator 210A is presented by the heads-up display 202. The collision warning indicator 210A is displayed near a center region of the display, aligned with the predicted collision path between the present vehicle and the vehicle 208.

Additional graphical elements are shown within the viewing scenario 200A. A first graphical element 212A is displayed in a right-hand region of the display to indicate a vehicle operating parameter (such as a driving speed of the present vehicle). A second graphical element 214 is displayed in a left-hand region near the collision warning indicator 210A to indicate an environmental parameter. The graphical elements 210A, 212A, and 214 are displayed with luminance levels that are determined based on corresponding importance levels, spatial positions within the heads-up display 202, and information obtained from a real-world-facing camera (such as the real-world-facing camera 114 shown in FIG. 1) regarding the real-world environment comprising the road and the trees 206A-206D. The heads-up display 202 thereby overlays graphical elements of different importance levels in distributed regions of the display to provide situational information to the user (such as the user 106 shown in FIG. 1) while preserving visibility of the real-world environment.

It will be understood that FIG. 2A provides a schematic illustration of the viewing scenario 200A to support explanation of the operation and visual output of the heads-up display 202. Additional graphical elements, road markers, environmental objects, or interface components may also be presented within the heads-up display 202 depending on operational requirements and implementation configurations.

Figure 2B:
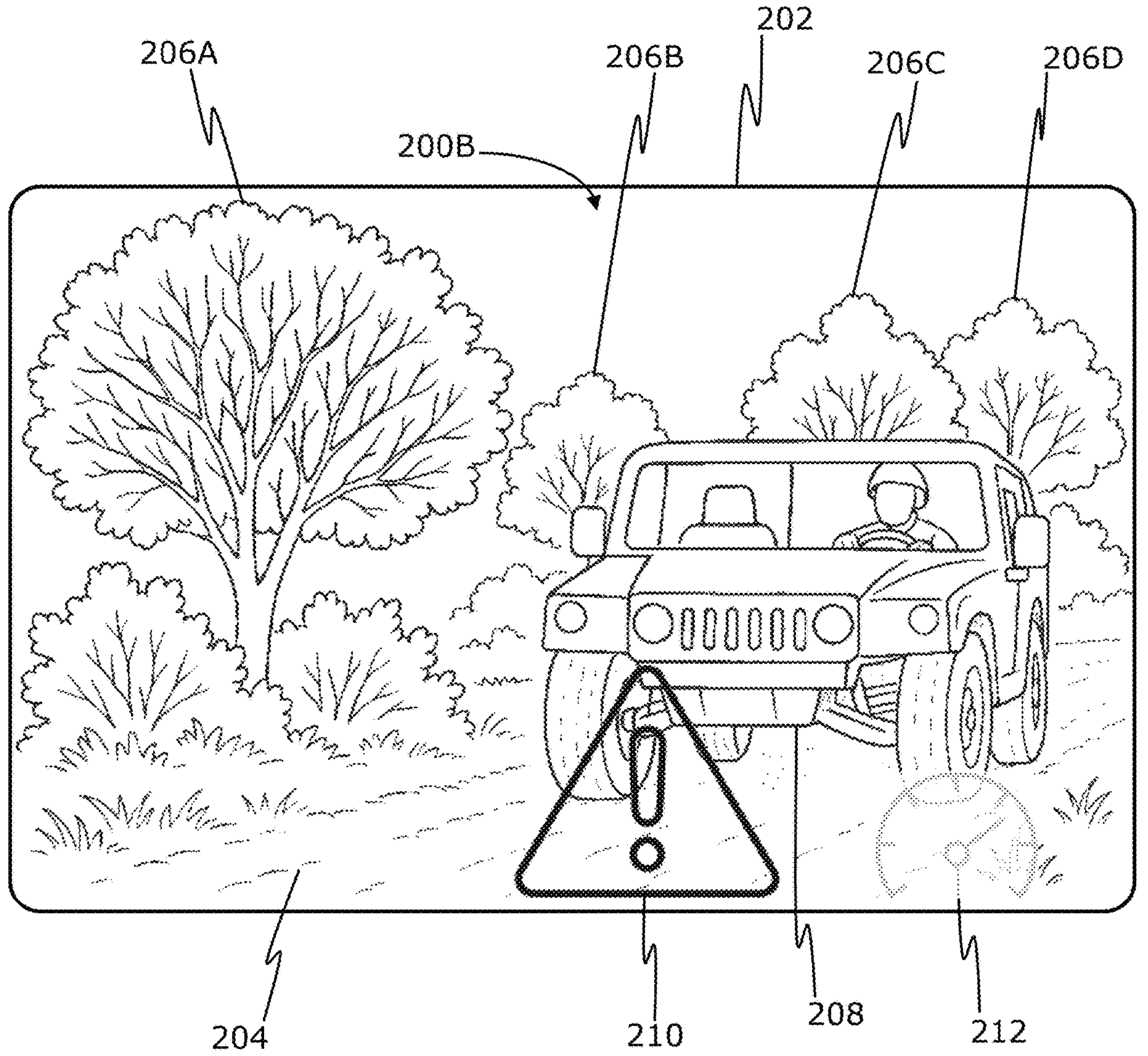
FIG. 2B illustrates another exemplary viewing scenario, which is a continuation of the viewing scenario shown in FIG. 2A, in accordance with an embodiment of the present disclosure.

FIG. 2B illustrates another exemplary viewing scenario 200B, which is a continuation of the viewing scenario 200A shown in FIG. 2A, in accordance with an embodiment of the present disclosure. The viewing scenario 200B depicts adjustments made to graphical elements presented by the heads-up display 202 of the present vehicle when the thermal load associated with operation of the heads-up display 202 exceeds the current thermal budget.

As shown, the second graphical element 214 (not shown in FIG. 2B but shown in FIG. 2A) is assigned a normal importance level and is disabled. The disabling of the second graphical element 214 reduces the thermal load by removing presentation of a non-critical graphical element. Further, the first graphical element 212A (not shown in FIG. 2B but shown in FIG. 2A), having an intermediate importance level, is retained within the heads-up display 202, but a luminance level thereof is decreased as part of the adjustment performed when the thermal load exceeds the current thermal budget. The adjustment performed to the graphical element 212A is illustrated using a graphical element 212B in FIG. 2B. The reduction of luminance lowers the thermal load while continuing to provide presentation of the vehicle operating parameter (such as the driving speed of the vehicle) to the user.

The graphical element representing the collision warning indicator 210A (not shown in FIG. 2B but shown in FIG. 2A), having a critical importance level, is moved to a central zone of the heads-up display 202 and its luminance is increased. The adjustment to the collision warning indicator 210A is illustrated using a graphical element 210B in FIG. 2B. The relocation and luminance increase of the collision warning indicator 210 improves its visual prominence against the background while maintaining visibility of the real-world environment, even under conditions in which the thermal load exceeds the thermal budget. The viewing scenario 200B thereby illustrates redistribution of graphical elements in response to the thermal load exceeding the thermal budget, with the collision warning indicator 210 being emphasised by increased luminance and central placement, the first graphical element 212B being dimmed, and the second graphical element 214 being disabled.

It will be understood that FIG. 2B provides a schematic illustration of the viewing scenario 200B to support explanation of operation of the heads-up display 202 in managing graphical elements in response to the thermal load exceeding the thermal budget. Additional graphical elements or interface configurations may also be implemented depending on operational requirements and vehicle system integrations.

Figure 3A:
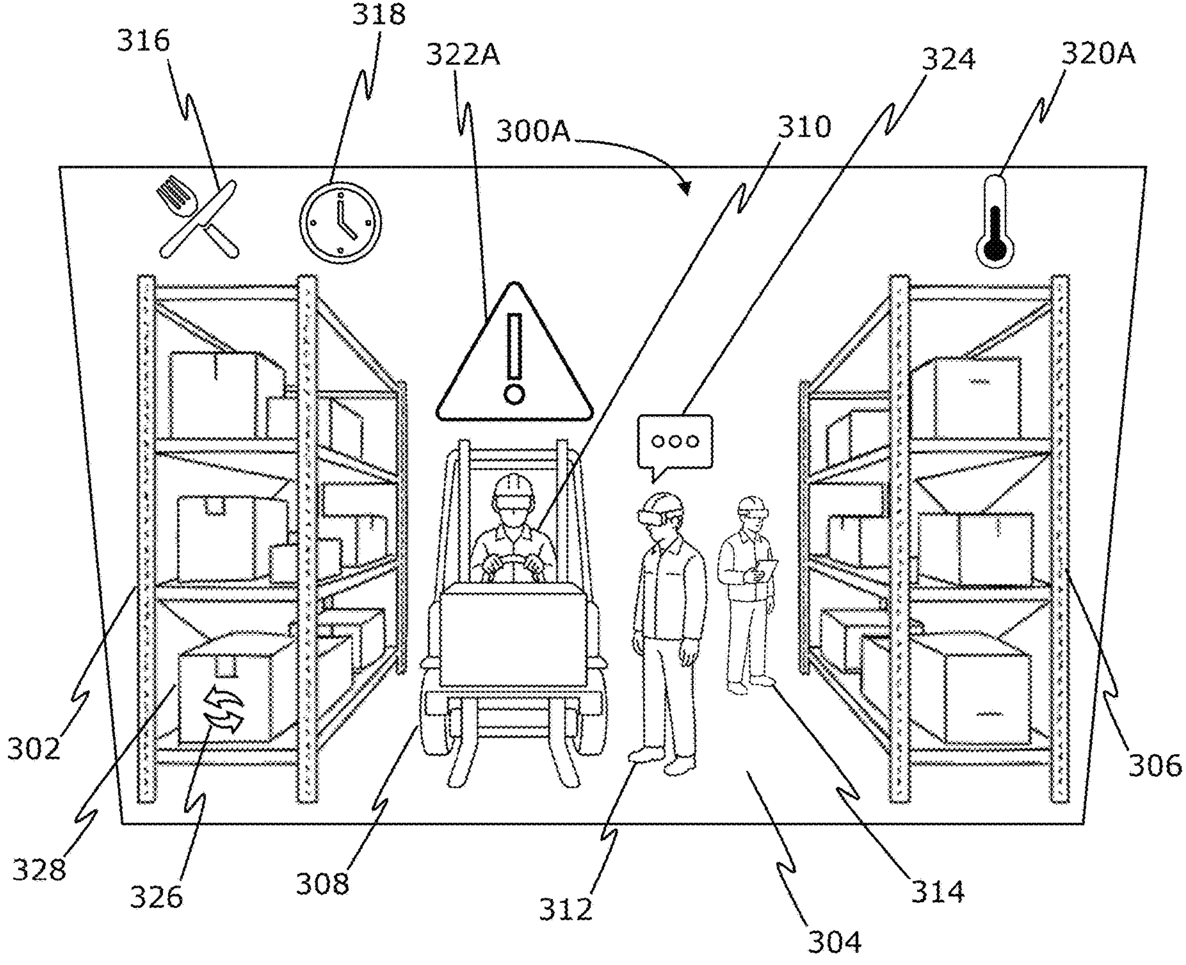
FIG. 3A illustrates an exemplary viewing scenario as perceived through a heads-up display, in accordance with an embodiment of the present disclosure.

FIG. 3A illustrates an exemplary viewing scenario 300A as perceived through a heads-up display, in accordance with an embodiment of the present disclosure. The heads-up display is worn by an employee operating within a warehouse environment. The viewing scenario 300A is presented from a perspective of such an employee and shows multiple real-world objects and associated graphical elements rendered by the heads-up display.

The viewing scenario 300A includes a rack 302 on a left side of a warehouse aisle 304 and another rack 306 on a right side of the aisle 304. Positioned within the aisle 304 is a forklift 308, which is operated by a forklift operator 310. Another employee 312, such as a supervisor or shift manager, is shown standing adjacent to the forklift 308, while a further employee 314 is present further along the aisle 304.

The heads-up display also presents a plurality of graphical elements rendered as overlays onto the real-world environment. A graphical element 316 is shown at a top-left region of the display and represents a knife-and-fork icon, indicating an upcoming scheduled break or lunchtime. Adjacent to the graphical element 316 is another graphical element 318 in the form of a clock icon, providing a contextual time indicator in association with the upcoming scheduled break or lunchtime reminder. Yet another graphical element 320A is shown in a top-right region of the display and corresponds to a thermostat icon representing a temperature of an ambient environment surrounding the heads-up display worn by the employee.

Additionally, positioned directly above the forklift 308 is a graphical element 322A, which corresponds to a safety warning indicator visually associated with the forklift 308 to indicate an active danger zone or movement hazard. A further graphical element 324 is displayed above the employee 312 and corresponds to a message indicator, denoting that a communication or task instruction has been received from the employee 312. Still another graphical element 326 is displayed as overlaid on a package 328 located on the rack 302 on the left side of the aisle 304. The graphical element 326A resembles a circular refresh icon with two opposing arrows and indicates that the associated package 328 is marked for repositioning, rearrangement, or inventory rotation.

It will be understood that FIG. 3A provides a schematic illustration of the viewing scenario 300A to support explanation of the operation of the heads-up display in presenting graphical elements within a warehouse environment, including contextual information related to ambient temperature, workplace safety, and task management. Additional graphical elements or interface configurations may be implemented depending on operational requirements and system integrations.

Figure 3B:
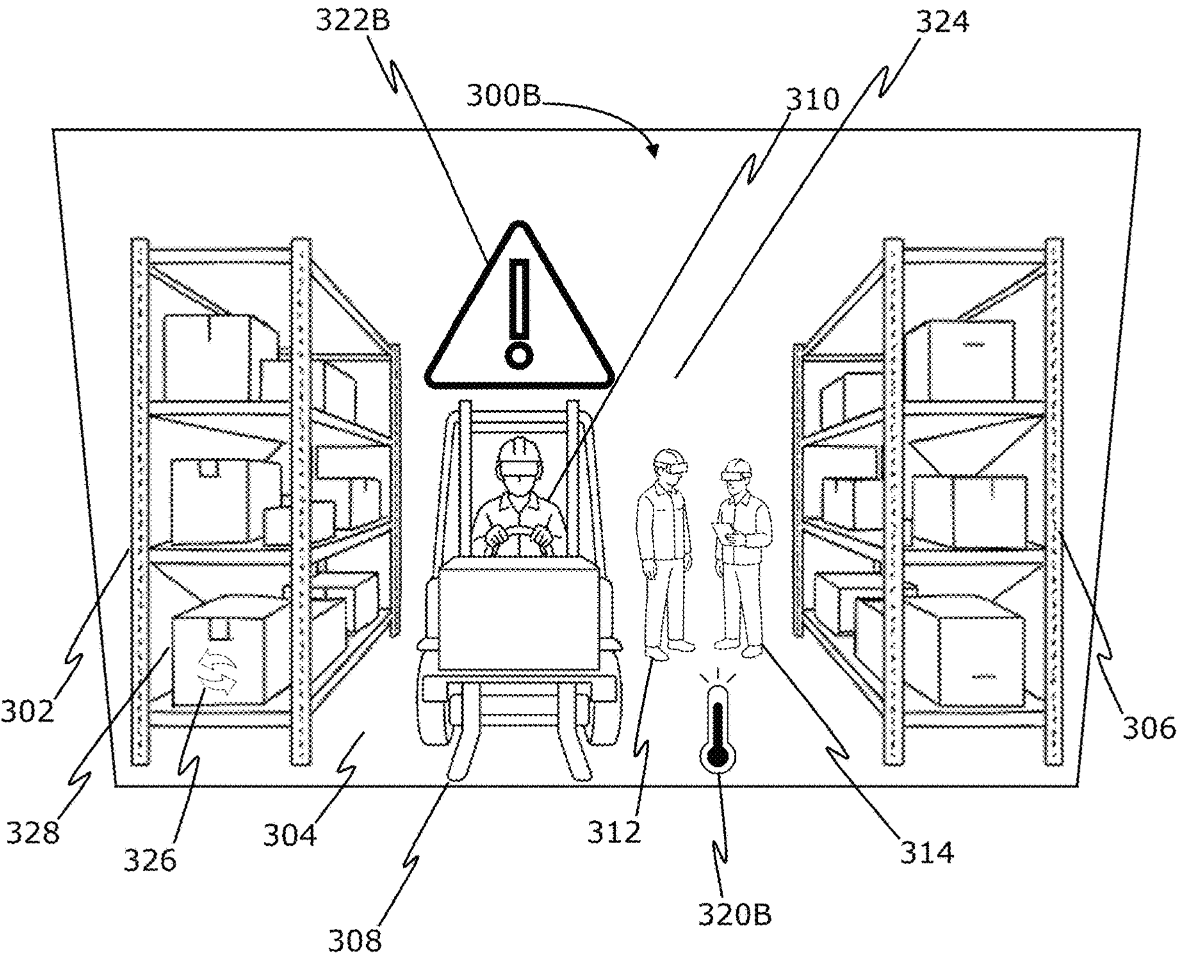
FIG. 3B illustrates a modified exemplary viewing scenario of the viewing scenario shown in FIG. 3A, in accordance with an embodiment of the present disclosure.

FIG. 3B illustrates a modified exemplary viewing scenario 300B of the viewing scenario 300A shown in FIG. 3A, in accordance with an embodiment of the present disclosure. The viewing scenario 300B corresponds to a subsequent scene of the viewing scenario 300A as perceived through the same heads-up display worn by the employee within the warehouse environment. The viewing scenario 300B reflects dynamic updates made to graphical elements rendered by the heads-up display based on real-world changes and a condition where the thermal load has exceeded a current thermal budget.

In the viewing scenario 300B, the forklift 308 has moved forward within the aisle 304 and is positioned in closer proximity to the employee wearing the heads-up display. In response, the graphical element 322B representing the safety warning indicator is presented with increased visual prominence. The graphical element 322B is presented with increased luminance to emphasise its importance level to the proximity hazard associated with the forklift 308.

Due to absence of immediate relevance, the graphical elements 316 and 318, which respectively represented the knife-and-fork icon and the clock icon in FIG. 3A, have been deactivated. Accordingly, the graphical elements 316 and 318 are not displayed in the viewing scenario 300B, thereby reducing the number of concurrently active overlays and lowering luminance load during the thermal-budget-exceeded condition. Additionally, the employee 312, who was earlier positioned near the forklift 308, is now shown to have walked further along the aisle 304 and is standing adjacent to the employee 314. The graphical element 324 representing the message indicator associated with the employee 312 has likewise been deactivated and is not displayed in the viewing scenario 300B.

The graphical element 320A, which corresponds to the thermostat icon representing the ambient temperature surrounding the heads-up display, has been modified to a graphical element 320B to reflect that the thermal load has exceeded the permissible thermal budget. The condition of thermal load exceedance can arise from a sudden increase in ambient temperature due to heat emanating from the forklift 308 moving closer to the employee or from a rise in environmental temperature caused by weather changes. To maintain priority visibility under this condition, the graphical element 320B has been relocated from the top-right region to a central zone of the display and is rendered with increased luminance.

The graphical element 326B associated with the package 328 on the rack 302 remains presented in the viewing scenario 300B, but is displayed with reduced visual prominence. The graphical element 326 is dimmed to operate at a lower luminance level in view of the ongoing thermal-budget management strategy. This dimming of the graphical element 326B preserves visibility of the package instruction while reducing additional thermal load on the display.

It will be understood that FIG. 3B provides a schematic illustration of the modified viewing scenario 300B to support explanation of runtime adaptation of the graphical elements by the heads-up display under conditions where the thermal load exceeds a current thermal budget. The relocation of the graphical element 320B from an upper region to the central zone of the display is shown for illustrative clarity only. It will be appreciated that other relocations between different zones, such as edge to centre, diagonal repositioning, or clustering within bands reserved for high-priority operation, are also possible. Thus, the system not only performs upper-to-central movement of graphical elements but also relocates, dims, scales, activates, or deactivates graphical elements across different zones of the display so that thermal load is managed while priority information remains presented.

Figure 4:
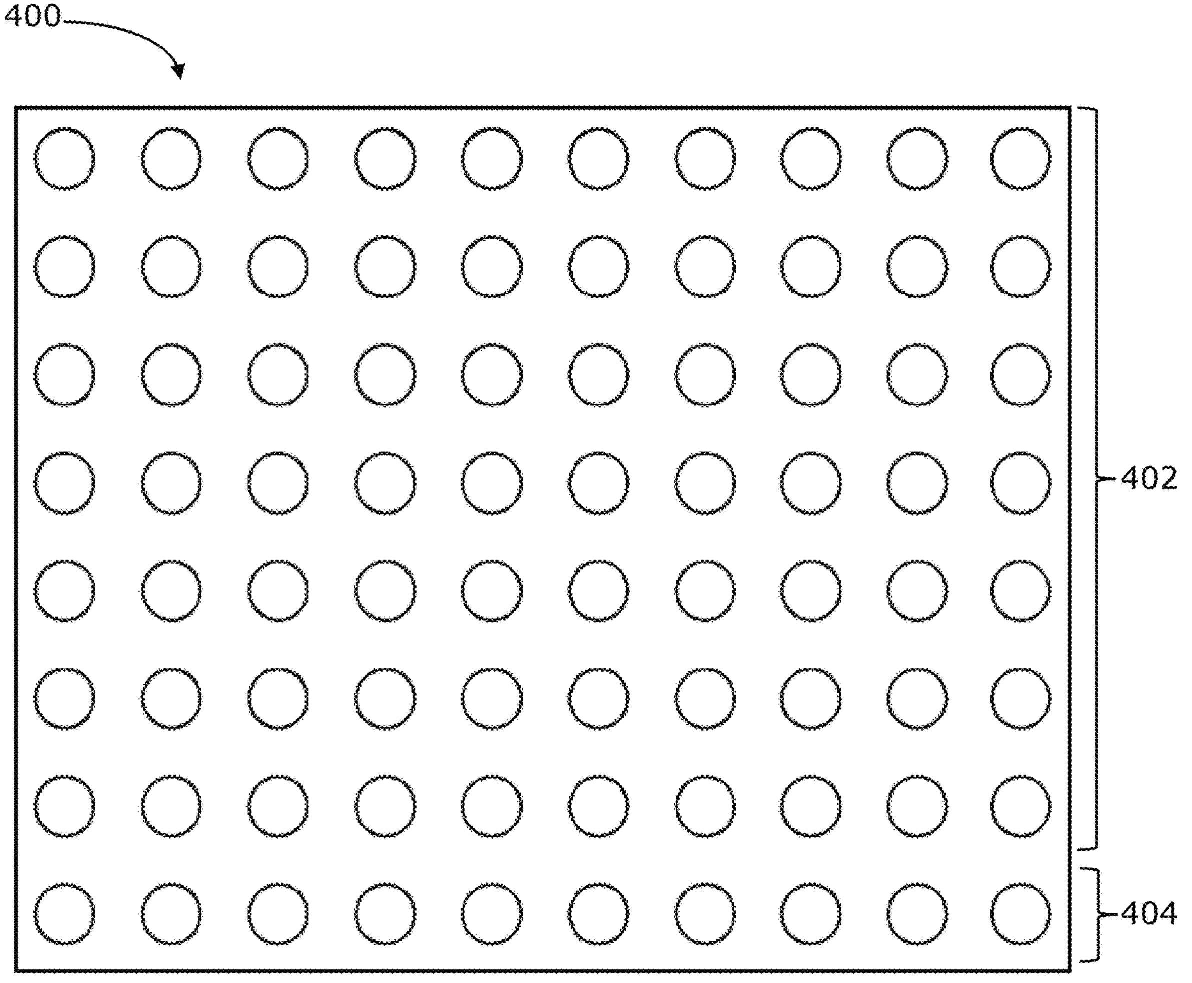
FIG. 4 illustrates an exemplary display, in accordance with an embodiment of the present disclosure.

FIG. 4 illustrates an exemplary display 400, in accordance with an embodiment of the present disclosure. The display 400 shows a relocation operation performed by the system (such as the system 100 shown in FIG. 1) under a condition where the thermal load has exceeded a current thermal budget.

The display 400 comprises an upper zone 402 and a lower zone 404. In an initial state, graphical elements are presented within the upper zone 402, requiring the upper zone 402 to be actively driven. When the thermal load exceeds the current thermal budget, the graphical elements are relocated from the upper zone 402 to the lower zone 404. As a result, both the relocated graphical elements and any pre-existing graphical elements assigned to the lower zone 404 are presented within the same zone.

The relocating of graphical elements from the upper zone 402 to the lower zone 404 reduces the number of zones simultaneously activated within the display 400. This reduction in concurrently active zones lowers the thermal load generated during zone driving while maintaining presentation of required graphical elements under the thermal-budget-exceeded condition. A technical benefit of this relocation is that priority information remains visible to the employee while the display 400 manages thermal stress within permissible operational limits.

It will be understood that FIG. 4 provides a schematic illustration of the display 400 to support explanation of graphical element relocation for zone sharing under thermal-budget-exceeded conditions. The relocation of the graphical elements from the upper zone 402 to the lower zone 404 is shown for illustrative clarity only. Other relocations between different zones, such as left to right, centre to edge, diagonal repositioning, or clustering within bands reserved for priority operation, are also possible.

Figure 5:
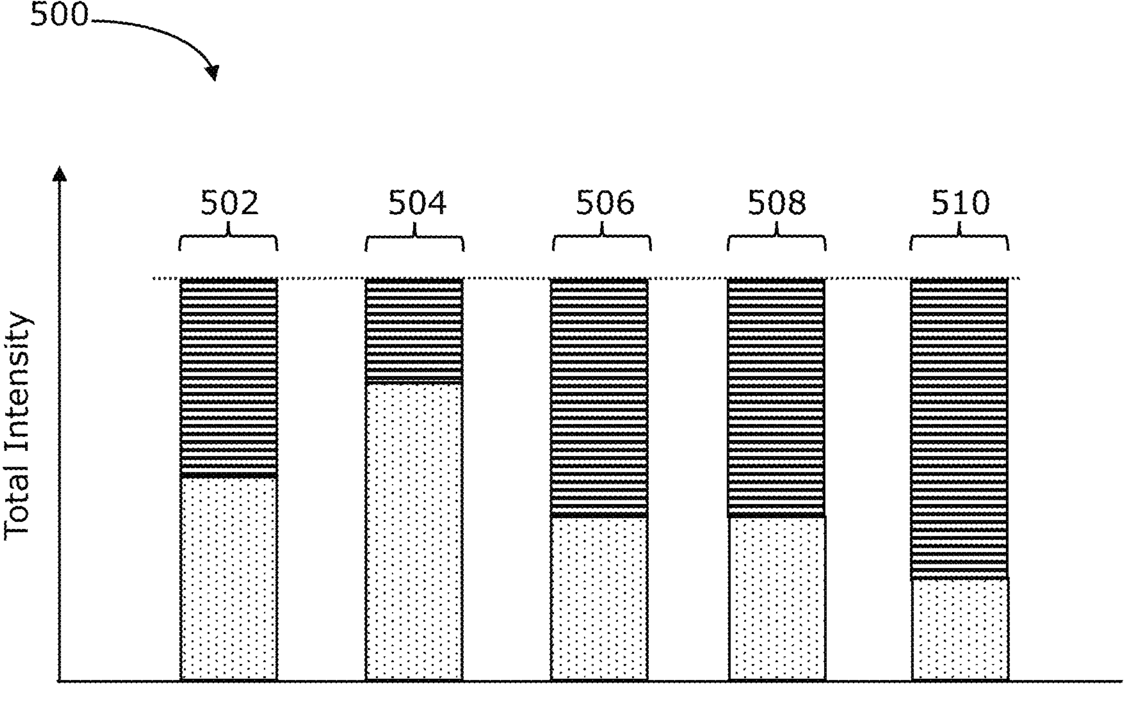
FIG. 5 illustrates a graph, in accordance with an embodiment of the present disclosure.

FIG. 5 illustrates a graph 500, in accordance with an embodiment of the present disclosure. The graph 500 represents variations of backlight intensity and pixel intensity contributing to a total intensity of graphical element presentation by the display. The vertical axis of the graph 500 denotes the total intensity, whereas the horizontal arrangement represents different operating scenarios of intensity balancing between backlight intensity and pixel intensity control.

The graph 500 comprises a plurality of cases represented by bar groups 502, 504, 506, 508, and 510. Each bar group 502, 504, 506, 508, and 510 comprises a dotted portion corresponding to backlight intensity and a horizontally hatched portion corresponding to pixel intensity. In the case 502, the backlight intensity and the pixel intensity are substantially equal. In the case 504, the backlight intensity is increased compared to the backlight intensity in case 502, which causes a corresponding reduction in pixel intensity while maintaining the same total intensity. In the cases 506 and 508, the backlight intensity is reduced in comparison to the backlight intensity in cases 502 and 504 and the pixel intensity is correspondingly increased to preserve the total intensity at the same level, with both cases representing similar operating distributions. In the case 510, the backlight intensity is at its lowest value compared to the other cases 502, 504, 506 and 508, whereas the pixel intensity is at its highest value compared to the other cases 502, 504, 506 and 508, maintaining the total intensity substantially constant with the other cases 502, 504, 506 and 508.

The graph 500 thus schematically illustrates that the system (such as the system 100 of FIG. 1) maintains a consistent total intensity for presentation of graphical elements by dynamically adjusting the relative contribution of backlight intensity and pixel intensity. The bar groups 502, 504, 506, 508, and 510 represent alternative ways in which the minimum and maximum luminance levels of zones may be driven through a combination of backlight intensity and pixel intensity while preserving total intensity. Such balancing enables the display (such as the display 102 shown in FIG. 1) to maintain visual uniformity while allowing run-time adjustment of backlight drive and pixel transmission in accordance with system constraints.

Figure 6:
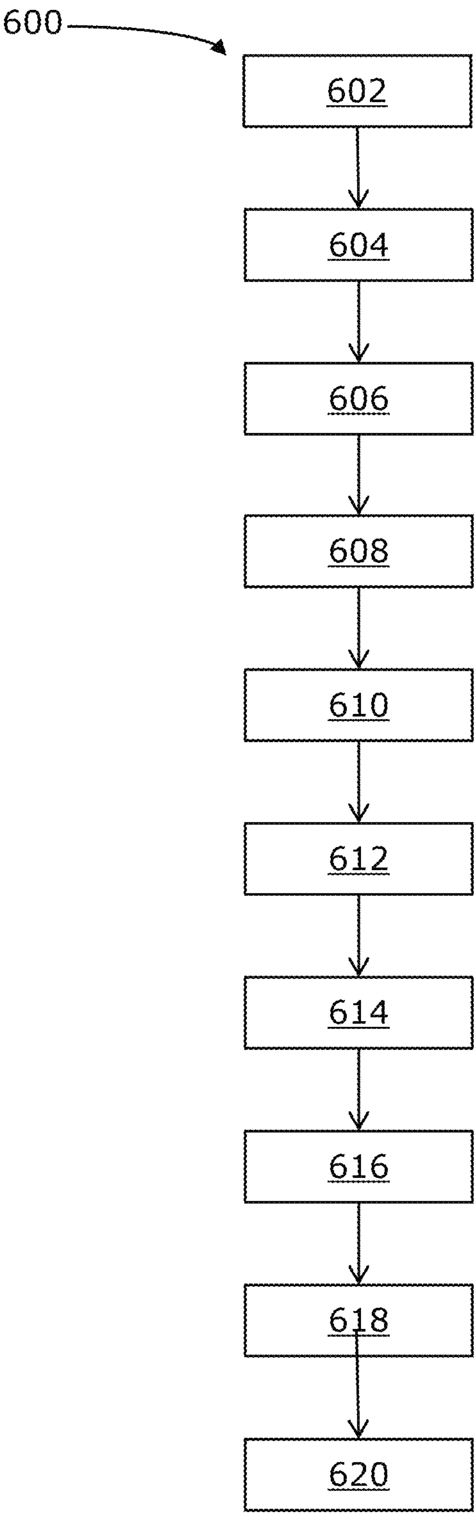
FIG. 6 shows steps of a method, in accordance with an embodiment of the present disclosure.

FIG. 6 shows steps of a method 600, in accordance with an embodiment of the present disclosure.

At step 602, at least one of a temperature of a display and a temperature of an ambient environment surrounding the display is sensed using at least one temperature sensor.

At step 604, a plurality of graphical elements to be presented in a sequence of images is identified.

At step 606, for each graphical element, a corresponding importance level is determined.

At step 608, for each graphical element, a corresponding set of zones within the display that are to be used to present the graphical element is determined, wherein the display comprises a plurality of zones whose luminance is individually controllable.

At step 610, for each zone, a minimum luminance level and a maximum luminance level are determined, based on at least one graphical element to be presented by the zone and an importance level of the at least one graphical element.

At step 612, a power usage of the display is monitored.

At step 614, a thermal load of the display is estimated based on the monitored power usage and at least one of the temperature of the display and the temperature of the ambient environment.

At step 616, it is determined whether the thermal load exceeds a current thermal budget.

At step 618, when it is determined that the thermal load exceeds the current thermal budget, first zones that correspond to at least one graphical element having a lowest importance level are identified.

At step 620, luminance levels of the first zones are adjusted to lie between respective minimum luminance levels and respective maximum luminance levels.

The aforementioned steps are only illustrative and other alternatives can also be provided where one or more steps are added, one or more steps are removed, or one or more steps are provided in a different sequence without departing from the scope of the claims herein.

The invention claimed is:

1. A system comprising:

a display comprising a plurality of zones whose luminance is individually controllable;

at least one temperature sensor employed to sense at least one of: a temperature of the display, a temperature of an ambient environment surrounding the display; and at least one processor configured to:

identify a plurality of graphical elements to be presented in a sequence of images;

for each graphical element, determine a corresponding importance level;

for each graphical element, determine a corresponding set of zones within the display that are to be used to present said graphical element;

for each zone, determine a minimum luminance level and a maximum luminance level, based on at least one graphical element to be presented by said zone, and an importance level of the at least one graphical element;

monitor a power usage of the display;

estimate a thermal load of the display based on the power usage and the at least one of: the temperature of the display, the temperature of the ambient environment;

determine whether the thermal load exceeds a current thermal budget; and when it is determined that the thermal load exceeds the current thermal budget, identify first zones that correspond to at least one graphical element having a lowest importance level; and adjust luminance levels of the first zones to lie between respective minimum luminance levels and respective maximum luminance levels.

2. The system of claim 1, wherein the at least one processor is configured to:

when it is determined that the thermal load exceeds the current thermal budget, determine whether a subsequent thermal load of the display still exceeds the current thermal budget, after adjusting the luminance levels of the first zones; and when it is determined that the subsequent thermal load still exceeds the current thermal budget, identify second zones that correspond to at least one graphical element whose importance level is higher than the lowest importance level and lower than a highest importance level; and adjust luminance levels of the second zones to lie between respective minimum luminance levels and respective maximum luminance levels, until a further subsequent thermal load of the display does not exceed the current thermal budget.

3. The system of claim 1, wherein a size of a single zone is larger than a size of a single pixel of the display, wherein the at least one processor is configured to:

when it is determined that the thermal load exceeds the current thermal budget, identify at least one graphical element from among the plurality of graphical elements that is not constrained to a fixed position in the sequence of images; and relocate the at least one graphical element to a position proximate to at least one other graphical element from among the plurality of graphical elements, wherein at least one other zone is used to present both the at least one graphical element and the at least one other graphical element.

4. The system of claim 3, wherein when relocating, the at least one processor is configured to relocate a plurality of graphical elements to be presented within a predefined portion of a view frustum of the display.

5. The system of claim 1, further comprising a tracker and at least one real-world-facing camera, wherein the display is a heads-up display, and wherein the at least one processor is configured to:

when it is determined that the thermal load exceeds the current thermal budget, determine relative positions of eyes of at least one user with respect to an image plane of the display, using the tracker;

capture, using the at least one real-world-facing camera, at least one real-world image of a real-world environment whose real-world light field is being augmented by the display;

identify at least one portion of the image plane for which a luminance level of a corresponding portion of the real-world light field as projected toward a given eye is lower than a predefined threshold luminance level, based on the at least one real-world image and a relative position of the given eye with respect to the image plane; and relocate at least one graphical element to be presented via at least one other zone that corresponds to the at least one identified portion of the image plane.

6. The system of claim 1, wherein the display is a heads-up display comprising an active optical device arranged on an optical path of a real-world light field of a real-world environment, wherein the at least one processor is configured to:

when it is determined that the thermal load exceeds the current thermal budget, activate at least one portion of the active optical device to decrease a transmission of a part of the real-world light field passing therethrough toward a given eye of at least one user; and relocate at least one graphical element to be presented via at least one other zone that corresponds to the at least one portion of the active optical device.

7. The system of claim 1, wherein the at least one processor is configured to:

when it is determined that the thermal load exceeds the current thermal budget, perform at least one of:

reducing a size of at least one graphical element;

modifying at least one appearance parameter of at least one graphical element.

8. The system of claim 1, wherein the at least one processor is configured to:

when it is determined that the thermal load exceeds the current thermal budget, determine when at least one first zone corresponds to both a first graphical element having a first importance level and a first portion of a second graphical element having a second importance level that is lower than the first importance level, and when the at least one second zone corresponds to a second portion of the second graphical element only;

when it is determined that the at least one first zone corresponds to both the first graphical element and the first portion of the second graphical element, and the at least one second zone corresponds to the second portion of the second graphical element only, drive the at least one first zone at a first luminance level corresponding to the first importance level and the at least one second zone at a second luminance level corresponding to the second importance level; and adjust a rendered intensity of the first portion of the second graphical element in the sequence of images, to match an estimated perceived luminance of the first portion of the second graphical element with an estimated perceived luminance of the second portion of the second graphical element.

9. The system of claim 1, further comprising a tracker, wherein the at least one processor is configured to:

determine gaze directions of eyes of at least one user, using the tracker;

identify a graphical element at which the at least one user is looking, based on the gaze directions; and at least temporarily increase an importance level of the identified graphical element.

10. The system of claim 1, further comprising at least one real-world-facing camera, wherein the display is a heads-up display, and wherein the at least one processor is configured to:

capture, using the at least one real-world-facing camera, at least one real-world image of a real-world environment whose real-world light field is being augmented by the display;

identify a real-world object that lies on a predicted path of a vehicle in which the system is implemented; and at least temporarily increase an importance level of a graphical element that corresponds to the identified real-world object.

11. A method comprising:

sensing, using at least one temperature sensor, at least one of: a temperature of a display, a temperature of an ambient environment surrounding the display;

identifying a plurality of graphical elements to be presented in a sequence of images; for each graphical element, determining a corresponding importance level;

for each graphical element, determining a corresponding set of zones within the display that are to be used to present said graphical element, wherein the display comprises a plurality of zones whose luminance is individually controllable;

for each zone, determining a minimum luminance level and a maximum luminance level, based on at least one graphical element to be presented by said zone, and an importance level of the at least one graphical element;

monitoring a power usage of the display;

estimating a thermal load of the display based on the power usage and the at least one of: the temperature of the display, the temperature of the ambient environment;

determining whether the thermal load exceeds a current thermal budget; and when it is determined that the thermal load exceeds the current thermal budget, identifying first zones that correspond to at least one graphical element having a lowest importance level; and adjusting luminance levels of the first zones to lie between respective minimum luminance levels and respective maximum luminance levels.

12. The method of claim 11, further comprising:

when it is determined that the thermal load exceeds the current thermal budget, determining whether a subsequent thermal load of the display still exceeds the current thermal budget, after adjusting the luminance levels of the first zones; and when it is determined that the subsequent thermal load still exceeds the current thermal budget, identifying second zones that correspond to at least one graphical element whose importance level is higher than the lowest importance level and lower than a highest importance level; and adjusting luminance levels of the second zones to lie between respective minimum luminance levels and respective maximum luminance levels, until a further subsequent thermal load of the display does not exceed the current thermal budget.

13. The method of the claim 11, wherein a size of a single zone is larger than a size of a single pixel of the display, the method further comprising:

when it is determined that the thermal load exceeds the current thermal budget, identifying at least one graphical element from among the plurality of graphical elements that is not constrained to a fixed position in the sequence of images; and relocating the at least one graphical element to a position proximate to at least one other graphical element from among the plurality of graphical elements, wherein at least one other zone is used to present both the at least one graphical element and the at least one other graphical element.

14. The method of claim 11, wherein the step of relocating comprises relocating a plurality of graphical elements to be presented within a predefined portion of a view frustum of the display.

15. The method of claim 11, further comprising:

when it is determined that the thermal load exceeds the current thermal budget, determining when at least one first zone corresponds to both a first graphical element having a first importance level and a first portion of a second graphical element having a second importance level that is lower than the first importance level, and when the at least one second zone corresponds to a second portion of the second graphical element only;

when it is determined that the at least one first zone corresponds to both the first graphical element and the first portion of the second graphical element, and the at least one second zone corresponds to the second portion of the second graphical element only, driving the at least one first zone at a first luminance level corresponding to the first importance level and the at least one second zone at a second luminance level corresponding to the second importance level; and adjusting a rendered intensity of the first portion of the second graphical element in the sequence of images, to match an estimated perceived luminance of the first portion of the second graphical element with an estimated perceived luminance of the second portion of the second graphical element.

16. A system comprising:

a display comprising a plurality of zones whose luminance is individually controllable;

at least one temperature sensor employed to sense at least one of: a temperature of the display, a temperature of an ambient environment surrounding the display; and at least one processor configured to:

identify a plurality of graphical elements to be presented in a sequence of images; for each graphical element, determine a corresponding importance level;

for each graphical element, determine a corresponding set of zones within the display that are to be used to present said graphical element;

for each zone, determine a minimum luminance level and a maximum luminance level, based on at least one graphical element to be presented by said zone, and an importance level of the at least one graphical element;

monitor a power usage of the display;

estimate a thermal load of the display based on the power usage and the at least one of: the temperature of the display, the temperature of the ambient environment;

determine whether the thermal load exceeds a current thermal budget; and when it is determined that the thermal load exceeds the current thermal budget, identify first zones that correspond to at least one graphical element having a lowest importance level; and adjust luminance levels of the first zones to lie between respective minimum luminance levels and respective maximum luminance levels; and when it is determined that the thermal load exceeds the current thermal budget, determine whether a subsequent thermal load of the display still exceeds the current thermal budget, after adjusting the luminance levels of the first zones; and when it is determined that the subsequent thermal load still exceeds the current thermal budget, identify second zones that correspond to at least one graphical element whose importance level is higher than the lowest importance level and lower than a highest importance level; and adjust luminance levels of the second zones to lie between respective minimum luminance levels and respective maximum luminance levels, until a further subsequent thermal load of the display does not exceed the current thermal budget.

17. The system of claim 16, wherein a size of a single zone is larger than a size of a single pixel of the display, wherein the at least one processor is configured to:

when it is determined that the thermal load exceeds the current thermal budget, identify at least one graphical element from among the plurality of graphical elements that is not constrained to a fixed position in the sequence of images; and relocate the at least one graphical element to a position proximate to at least one other graphical element from among the plurality of graphical elements, wherein at least one other zone is used to present both the at least one graphical element and the at least one other graphical element.

* * * * *